United States Patent
Garia

(10) Patent No.: US 8,078,919 B2
(45) Date of Patent: Dec. 13, 2011

(54) METHOD, APPARATUS AND PROGRAM STORAGE DEVICE FOR MANAGING MULTIPLE STEP PROCESSES TRIGGERED BY A SIGNAL

(75) Inventor: Eden Garia, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1566 days.

(21) Appl. No.: 11/152,124

(22) Filed: Jun. 14, 2005

(65) Prior Publication Data

US 2007/0011675 A1 Jan. 11, 2007

(51) Int. Cl.
*G06F 11/00* (2006.01)
(52) U.S. Cl. ...... 714/47.1; 700/108; 700/110; 705/7.41; 702/81
(58) Field of Classification Search ............ 714/47, 714/38; 700/108, 110; 705/7.15, 7.41; 702/81
See application file for complete search history.

(56) References Cited

U.S. PATENT DOCUMENTS

| | | | | |
|---|---|---|---|---|
| 5,590,277 A * | 12/1996 | Fuchs et al. | ..... | 714/38 |
| 5,748,882 A * | 5/1998 | Huang | ..... | 714/47 |
| 5,948,112 A * | 9/1999 | Shimada et al. | ..... | 714/16 |
| 6,522,939 B1 * | 2/2003 | Strauch et al. | ..... | 700/116 |
| 6,640,151 B1 * | 10/2003 | Somekh et al. | ..... | 700/121 |
| 6,954,883 B1 * | 10/2005 | Coss et al. | ..... | 714/47 |
| 7,076,692 B2 * | 7/2006 | Grey | ..... | 714/15 |
| 7,124,101 B1 * | 10/2006 | Mikurak | ..... | 705/35 |
| 7,357,298 B2 * | 4/2008 | Pokorny et al. | ..... | 235/375 |
| 7,805,639 B2 * | 9/2010 | Mock et al. | ..... | 714/47 |
| 7,882,438 B2 * | 2/2011 | Markham et al. | ..... | 715/736 |
| 2003/0023336 A1 * | 1/2003 | Kreidler et al. | ..... | 700/108 |
| 2003/0109951 A1 * | 6/2003 | Hsiung et al. | ..... | 700/108 |
| 2005/0171627 A1 * | 8/2005 | Funk et al. | ..... | 700/121 |
| 2005/0187649 A1 * | 8/2005 | Funk et al. | ..... | 700/121 |

* cited by examiner

*Primary Examiner* — Marc Duncan
(74) *Attorney, Agent, or Firm* — Merchant & Gould

(57) ABSTRACT

A method, apparatus and program storage device for managing multiple step processes triggered by a signal is disclosed. Status records are created for each process step. When an error occurs, error status record in recorded in the status record. A user may then use the status record to identify the error, take corrective action and restart the process at the appropriate point for reprocessing the signals.

12 Claims, 7 Drawing Sheets

METHOD, APPARATUS AND PROGRAM STORAGE DEVICE FOR MANAGING MULTIPLE STEP PROCESSES TRIGGERED BY A SIGNAL

FIELD OF THE INVENTION

This disclosure relates in general to trouble-shooting and management of process chains, and more particularly to a method, apparatus and program storage device for managing multiple step processes triggered by a signal.

BACKGROUND

The ultimate goal of any business is to maximize profits. Every business relies on a set of activities or processes that allow the business to function. For example, a manufacturing business obtains raw materials and components, creates a product, and delivers that product to customers. Countless business processes within each organization carry these operations forward efficiently and profitably.

Processes can be examined at different points to provide an array of feedback to managers, e.g., at the production line or at the enterprise-wide. Frequently, processes are grouped for analysis by department or division. For example, procurement may examine the procurement processes to obtain resources and materials. Product development may examine the development processes to plan, design, and refine goods and services. Production may examine the production processes to manufacture and provide goods or services. Other areas may also examine their processes to maintain and improve efficiency and profitability, e.g., accounting, marketing, customer service, etc.

Actively managing such processes allow the identification of points of delay and inefficiencies that are invisible to the organization, e.g., eliminate flaws, reduce task time, decrease cost, etc. In addition, active process management facilitates improvement even in well-refined procedures. However, before a process can be improved, processes need to be documented. Documenting existing processes is a key step to achieving consistent quality, and it is the critical starting point of ISO and other quality certification.

Business processes may be represented as a number of potential conditions or states. At each point, the process performs a certain action, or the like, with the result or results therefrom directing the next process that needs to be performed. For any particular state, there may be more than one transition path. Moreover, there may be more than one transition path out of a state. For example, in a manufacturing environment, a loop may be involved wherein the production line produces many units of a device as a separate process. Such a loop can result in tens of processes if not hundreds.

In some instances, faults occur that result in a failure to execute the process. A failed process state refers to a fault wherein conditions for performing the process or exiting from the state are never met. For example, the process may enter a state and wait for a certain action that will never arrive. Once an occurrence of a failed process arises and is recognized, the system operator must identify and correct the cause of the failure. Sometimes the cause of the failed process may be easily discovered in the current process. Other times, the fault may be caused at a transition path selected at some point in the past. The cause of such a fault is difficult to identify because there may be a multitude of possible branches, paths and associated actions through which the process passed before the failure manifests itself. All pertinent possible combinations of states and paths and actions must then be examined in order to determine which is the cause.

To further complicate this practice, processes may involve third parties that perform a service to a manufacturer. For example, a manufacturer may sell products to a customer. The manufacturer may provide products to a third party for configuration. The third party may then ship the product to the customer after performing the third party services, e.g., configuration. At the same time, different business-to-business (B2B) standards, e.g., Electronic Data Interchange (EDI), may be used to transfer data between the third party, the manufacturer and the customer using networks, such as the Internet. Each of the B2B-type electronic signals may trigger a chain of different processes, which must be executed and managed.

Solutions for managing the processes have been developed. One such solution applies to a chain of only two processes. In this solution, the system processes the first part and the data is automatically committed by the system, e.g., SAP. Then the program performs the second part. If both parts are successful, the job is finished. If the first part fails, the whole signal can be re-processed after the problem is resolved. However, a problem occurs when the first part is successful but the second part fails. In this instance, two options are available: either rollback the first process (if possible) and reprocess the signal, or manually perform the second process. This procedure, although painful, can work for a simple two-part process.

The above procedure may be automated to provide additional efficiency. For example, when the original signal is received, the original signal is processed and the first part then creates another signal and sends to the system for the second step. If the second signal fails, then the second part can be re-processed independent of the original signal after the problem causing failure is removed. This process worked well for two steps although there is a certain amount of overhead involved with creation of the second signal. Further, it is not easy to trace back from the second signal to the first one and vice versa when was needed.

However, this procedure is not practical for a process having more than two parts. As mentioned above with reference to loops, for example, a process may produce tens of signals with each with having hundreds of additional signal associated therewith. Thus, hundreds of signals may result from each original signal. Such a large number of signals presents a large performance and storage overhead and is a very complex system to properly implement and maintain. Further, it is impossible for the user to work with this many signals because the user must navigate through many levels of different signals. Additional drawbacks include complexity in creating the signal to process the next step, creating new signals in each step takes execution time, many different signal types are required to perform each one specific process (for example create delivery), large amounts of data are provided in each signal, it is hard, if not impossible, to investigate the cause of an error and sometime the error tracing requires walking back to the first signal.

It can be seen that there is a need for a method, apparatus and program storage device for managing multiple step processes triggered by a signal.

SUMMARY OF THE INVENTION

To overcome the limitations in the prior art described above, and to overcome other limitations that will become apparent upon reading and understanding the present specification, the present invention discloses a method, apparatus and program storage device for managing multiple step processes triggered by a signal.

The present invention solves the above-described problems by providing status records for each process step. Status records may be used to show the steps taken in performing the process step. In addition, status records may be used to recover from errors that occur during a processing step. For example, when an error occurs, error status record may be recorded in the status record. A user may then use the status record to identify the error, take corrective action and restart the process at the appropriate point for reprocessing the signals.

A method in accordance with the principles of the present invention includes processing steps of a procedure and creating status records that are associated with each processing step of the procedure.

In another embodiment of the present invention, a device for managing multiple step processes triggered by a signal is provided. The device includes memory for storing data and a processor, coupled to the memory, the processor configured for processing steps of a procedure and creating status records that are associated with each processing step of the procedure.

In another embodiment of the present invention, a program storage device includes program instructions executable by a processing device to perform operations for managing multiple step processes triggered by a signal. The operations include processing steps of a procedure and creating status records that are associated with each processing step of the procedure.

In another embodiment of the present invention, a database is provided. The database includes status records associated with process steps, the status records assigned to each process step, the status records providing information for enabling an error to be corrected and the process restarted at a step prior to occurrence of the event causing the error.

In another embodiment of the present invention, a graphical user interface is provided. The graphical user interface includes a display upon which screens of information are presented, wherein at least one screen comprises a display of data records associated with process steps of a procedure, the data records including status records for use in restarting the procedure upon detection of a failure.

In another embodiment of the present invention, a status record associated with a process step in a procedure is provided. The status record includes data for identifying events associated with the process step, the data indicator for correcting errors and restarting the procedure upon failure of a process step.

In another embodiment of the present invention, a device for managing multiple step processes triggered by a signal is provided. The device includes means for storing data and means, coupled to the means for storing data, for processing steps of a procedure and creating status records that are associated with each processing step of the procedure.

In another embodiment of the present invention, a database is provided. The database includes means associated with process steps for restarting a procedure comprising the process steps.

In another embodiment of the present invention, a graphical user interface is provided. The graphical user interface includes means for selecting information and means for displaying information including a display of means associated with process steps of a procedure for use in restarting the procedure upon detection of a failure.

In another embodiment of the present invention, a status record associated with a process step in a procedure is provided. The status record includes means for identifying events associated with the process step, means for correcting errors and means for restarting the procedure upon failure of a process step.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for managing multiple step processes triggered by a signal. Status records are created for each process step. When an error occurs, error status record in recorded in the status record. A user may then use the status record to identify the error, take corrective action and restart the process at the appropriate point for reprocessing the signals.

Figure 1:
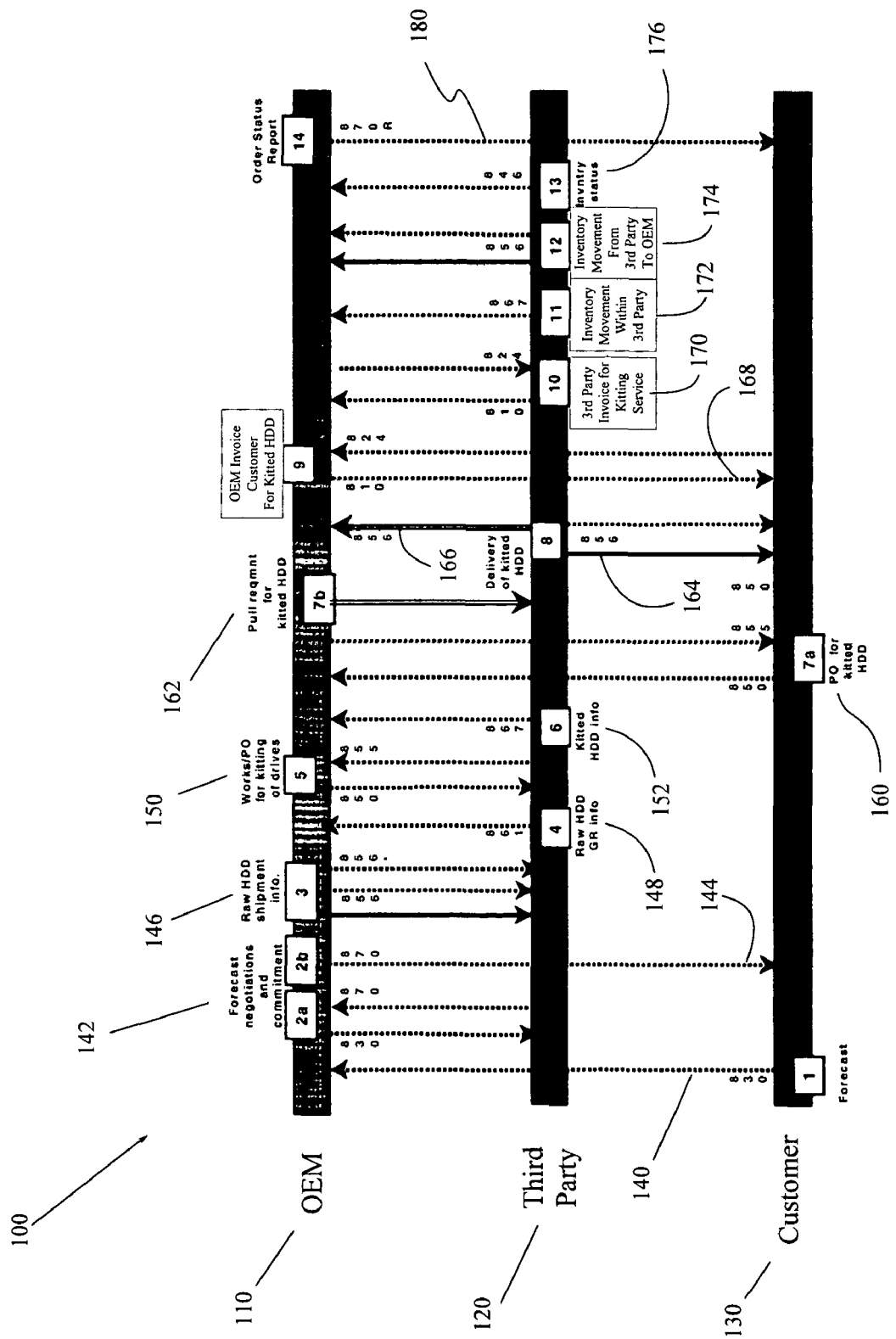
FIG. 1 illustrates a production process involving three parties according to one embodiment of the present invention.

FIG. 1 illustrates a production process 100 involving three parties according to one embodiment of the present invention. In FIG. 1, an original equipment manufacturer (OEM) 110 provides a product to a third party 120. The third party 120 processes the product. For example, the third party 120 may perform special packaging, configure the product to meet specific customer requirements, etc. The third party 120 after completion of its task may then provide the final product to a customer 130.

In FIG. 1, and throughout, the processes may be described using the production of a storage device such as a hard disk drive, as an example. However, those skilled in the art will readily recognize that the present invention is not meant to be limited to a particular type of product or to a process involving only three parties. Rather, those skilled in the art will recognize that the present invention may apply to different products and different production hierarchies and arrangements.

As shown in FIG. 1, a customer 130 provides forecast data 140 to a manufacturer. The manufacturer performs forecast negotiations 142 with at least a third party 120. The manufacturer 110 then provides commitment 144 to the customer 130. The manufacturer 110 provides "raw" product 146, e.g., a hard disk drive, to the third party 120. This signal to the third party 120 includes an advanced shipment notification including product identifying information such as serial numbers, etc. The third party 120 receives the "raw" product and informs the manufacturer of delivery information 148 including any delivery discrepancies. The manufacturer 110 issues orders 150 for preparation by the third party 120, e.g., "kitting" of hard disk drives. The third party "kitting" may range from materials sourcing, customization and product configuration to order fulfillment and global distribution. The third party 120 completes production of final product, e.g., "kitted" hard disk drives, and notifies 152 the manufacturer 110 of the quantities completed. Information 152, e.g., quantity and serial numbers, are forwarded to the manufacturer 110 allowing the manufacturer 110 to update their inventory.

The customer 130 may then issue purchase orders 160 to the manufacturer 110. The manufacturer 110 issues a pull requirement 162 to the third party 120 for a final product via purchase order information, e.g., for a kitted hard disk drive. The third party 120 creates delivery information and provides the final product 164 to the customer 130. The manufacturer 110 is provided notification of shipment quantities and identifying information 166 for inventory adjustment and warranty purposes. The manufacturer 110 sends an electronic invoice 168 to the customer 130 for delivery of the final product to the customer 130.

Upon final shipment of the final product, the third party 120 sends an invoice 170 to the manufacturer 110 for payment of services provided by the third party 120. The third party 120 also updates the manufacturer regarding movement of raw products within control of the third party 172 and movement from the third party to the manufacturer 174. Significant stock changes are report to the manufacturer 110 so that the manufacturer 110 can update their inventory. The third party 120 provides an inventory status report 176 to the manufacturer 110 that provides a snapshot overview of inventory information at a given time. The manufacturer 110 issues an order status report 180 to the customer 130.

As can be seen, the processes involved are complex and may include multiple step processes that are triggered by a single signal. For example, process 166 may be stopped because of an error after successful processing of six steps before the error step. In this situation, an error message may be sent to a user and the user may refer to a status record associated with the process, as will be described in greater detail below, to research the problem and reprocess the message. The processing will then continue from the last successfully completed step.

Figure 2:
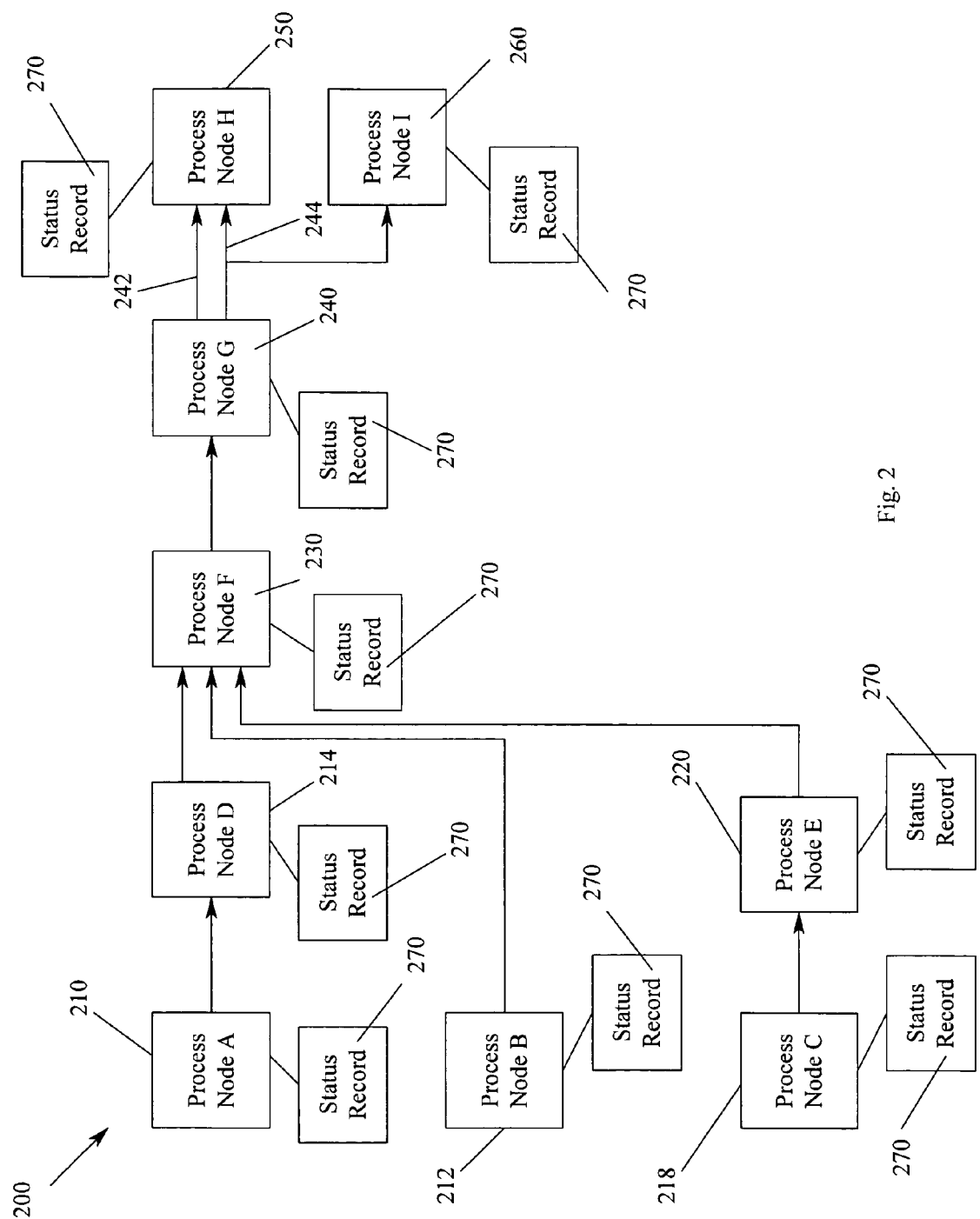
FIG. 2 illustrates a subset of a process chain according to an embodiment of the present invention.

FIG. 2 illustrates a subset of a process chain 200 according to an embodiment of the present invention. In FIG. 2, a process node A 210 provides a signal to process node D 214. Process node C 218 provides a signal to process node E 220. Process node D 214 processes the signal from process node A 210 and provides a signal to process node F 230. Process node F 230 also receives signals from process node B 212 and process node E 220. Process node F 230 processes the signals from process nodes B 212, D 214 and E 220, and provides a signal to process node G 240. Process node G 240 issues two signals, wherein a first 242 and second 244 signals from process node G 240 are provided to process node H 250, while process node I 260 only receives the second signal 244 from process node G 240.

As can be seen, process nodes may receive or issue one or more signals. In fact, the procedure described above with reference to FIG. 1 will be much more complex than the example of the process chain shown in FIG. 2. FIG. 2 also shows status records 270 that provide key information being associated with each process node. As described below the status records 270 include key data for identifying events occurring in each step so that a user can view an error, determine its source and correct the processes. Thus, those skilled in the art will recognize, from FIG. 2, the operation of B2B-type electronic signals and the triggering of a signal based upon multiple step processes and signals using the status records 270 according to an embodiment of the present invention.

Figure 3:
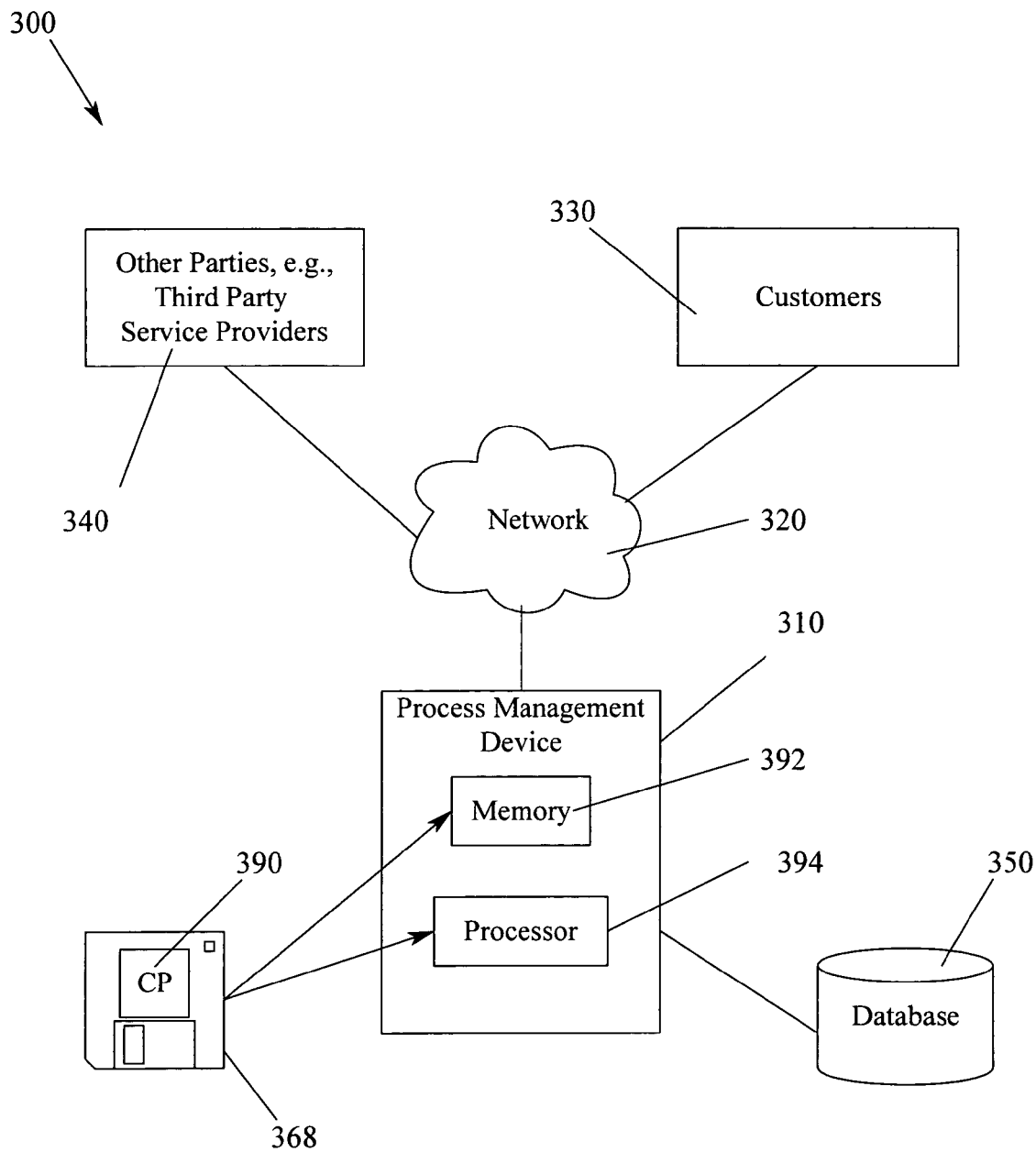
FIG. 3 illustrates a device for creating and maintaining status records for managing process chains according to an embodiment of the present invention.

FIG. 3 illustrates a device for creating and maintaining status records for managing process chains 300 according to an embodiment of the present invention. In FIG. 3, a process management device 310 is provided. The process management device 310 includes a processor 394 and memory 392. The processor 394 may be configured to provide management of multiple step processes triggered by a signal according to embodiments of the present invention. The process management device 310 may be coupled via a network 320 to customers 330 and other parties 340, e.g., the third party described with reference to FIG. 1 above. For example, the network 320 may include the Internet. A database 350 may be provided for storing the status records and their association according to an embodiment of the present invention. Those skilled in art will recognize that the present invention is not meant to be limited to the structure described with reference to FIG. 3, but may include variations including an Intranet, distribution of the software for providing the management of multiple step processes triggered by a signal, storage configurations, etc.

Figure 4:
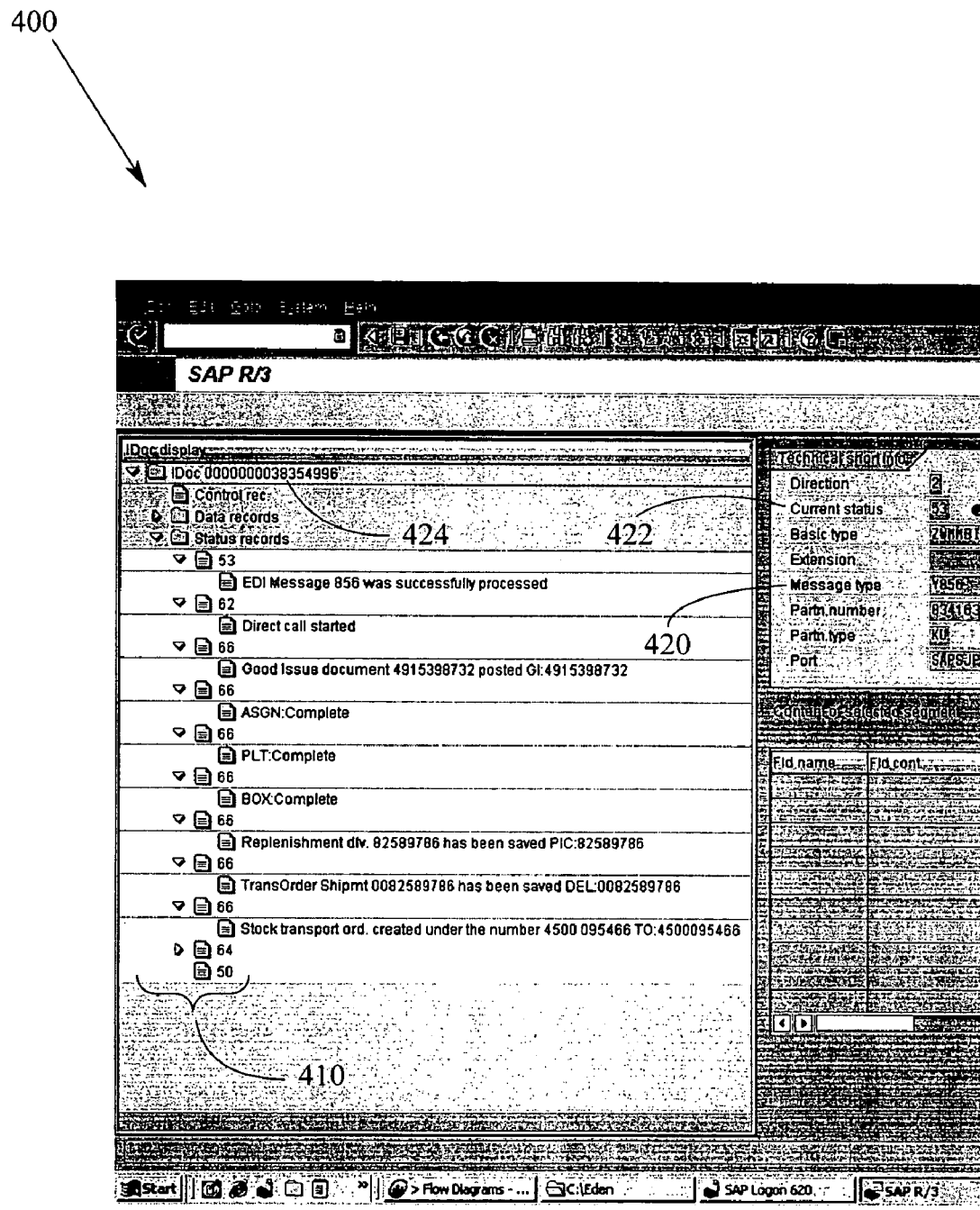
FIG. 4 is a screen shot for providing a visual display of the processes and the status associated with each process according to one embodiment of the present invention.

FIG. 4 is a screen shot 400 for providing a visual display of the processes and the status associated with each process according to one embodiment of the present invention. The screen shot 400 illustrated in FIG. 4 represents the signal providing the third party the "raw" product and information regarding delivery from the manufacturer. As can be seen in FIG. 4, the screen shot 400 includes a plurality of data records 410. The screen shot 400 includes a display of message type 420, current status 422 and intermediate document identifier 424. Additional information may also be included.

The data records 410 could be expanded to show the key data identifying the events that transpired in each step and, when there is an error in a step, key restart information. Thus, when an error occurs, a user can expand a data record 410 to review statuses occurring in the process chain thereby allowing the user to correct the problem and direct the signal for reprocessing.

Figure 5:
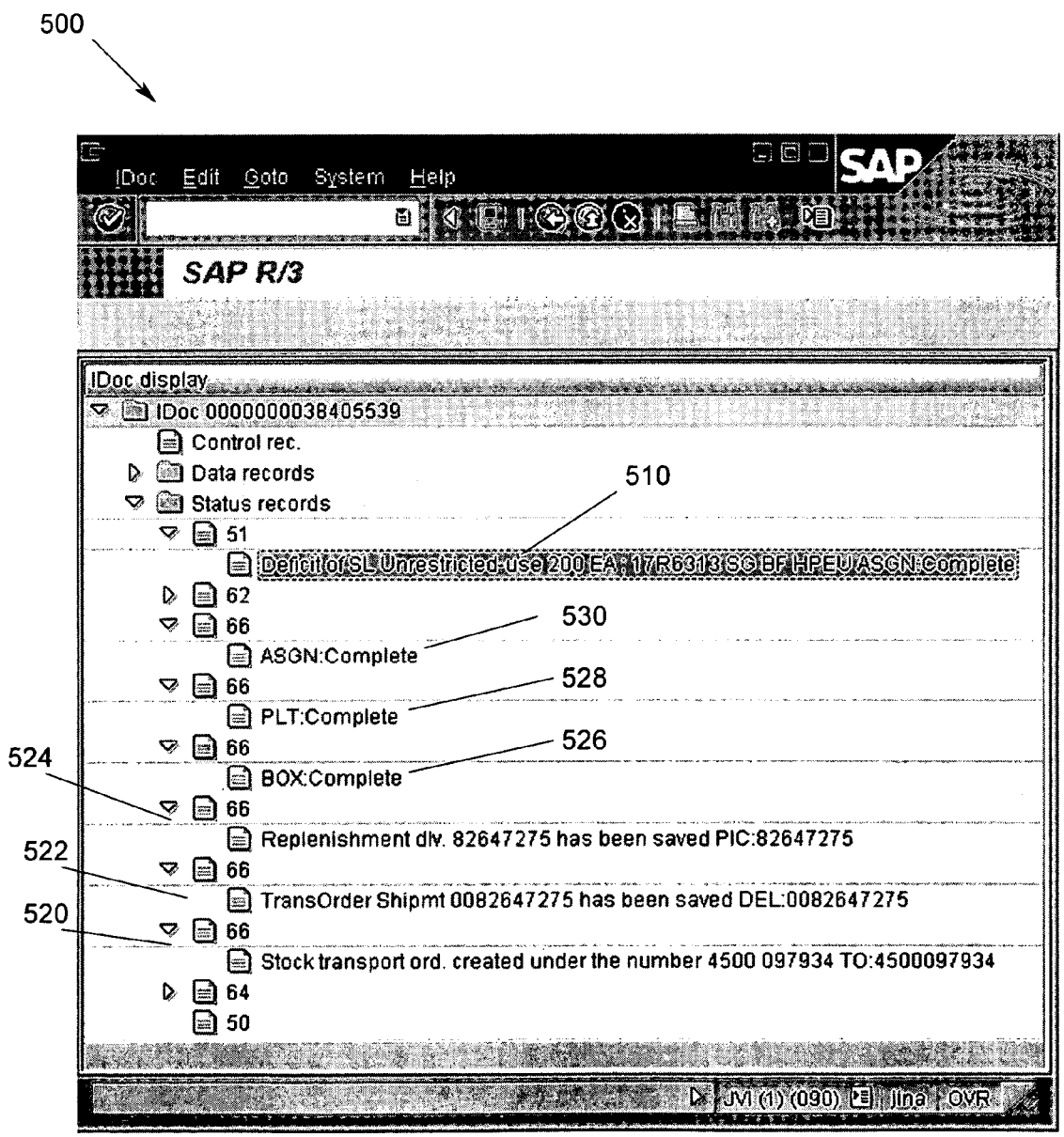
FIG. 5 is a screen shot from a system showing an error process step according to an embodiment of the present invention.

FIG. 5 is a screen shot 500 from a system showing an error process step according to an embodiment of the present invention. The screen shot 500 of FIG. 5 shows that the process has stopped with an error 510 after successful processing of six steps 520-530 before the error step 510. More specifically, a stock transport order was created 520. Then, a transfer order for the shipment is saved 522. To ensure inventories are maintained, a replenishment order is saved 524. The next step shows completion of a box 526. There may be many boxes involved in a single shipment. Thus, the next step shows completion of a pallet of boxes 528. The assignment of a pallet to a purchase order is then completed 530. However, in the next step, the system detects a stock level or quantity at a storage location that is below a threshold and therefore will not allow issue of the goods. Therefore, a signal indicating a deficit of SL Unrestricted-use is generated 510. For example, the process steps may contain many different sub-steps to reach completion. For example, the box creation process 526 in this example is a major step containing many sub-steps to create one box. Further, there might be hundreds boxes in one shipment. If any box creation fails, the box information will be recorded in the status record for user correction and re-submission of the signal. The same applies to Pallet creation step (PLT). As shown in FIG. 5, the user will receive this error message 510 in his mailbox, will research the problem, take corrective action and then reprocess the message. The processing will continue from the last successfully completed step (ASGN) 530. The status records are also used in the event of a system crashes. In this situation, the process will be restarted from the last successfully completed step after the system is brought back.

Figure 6:
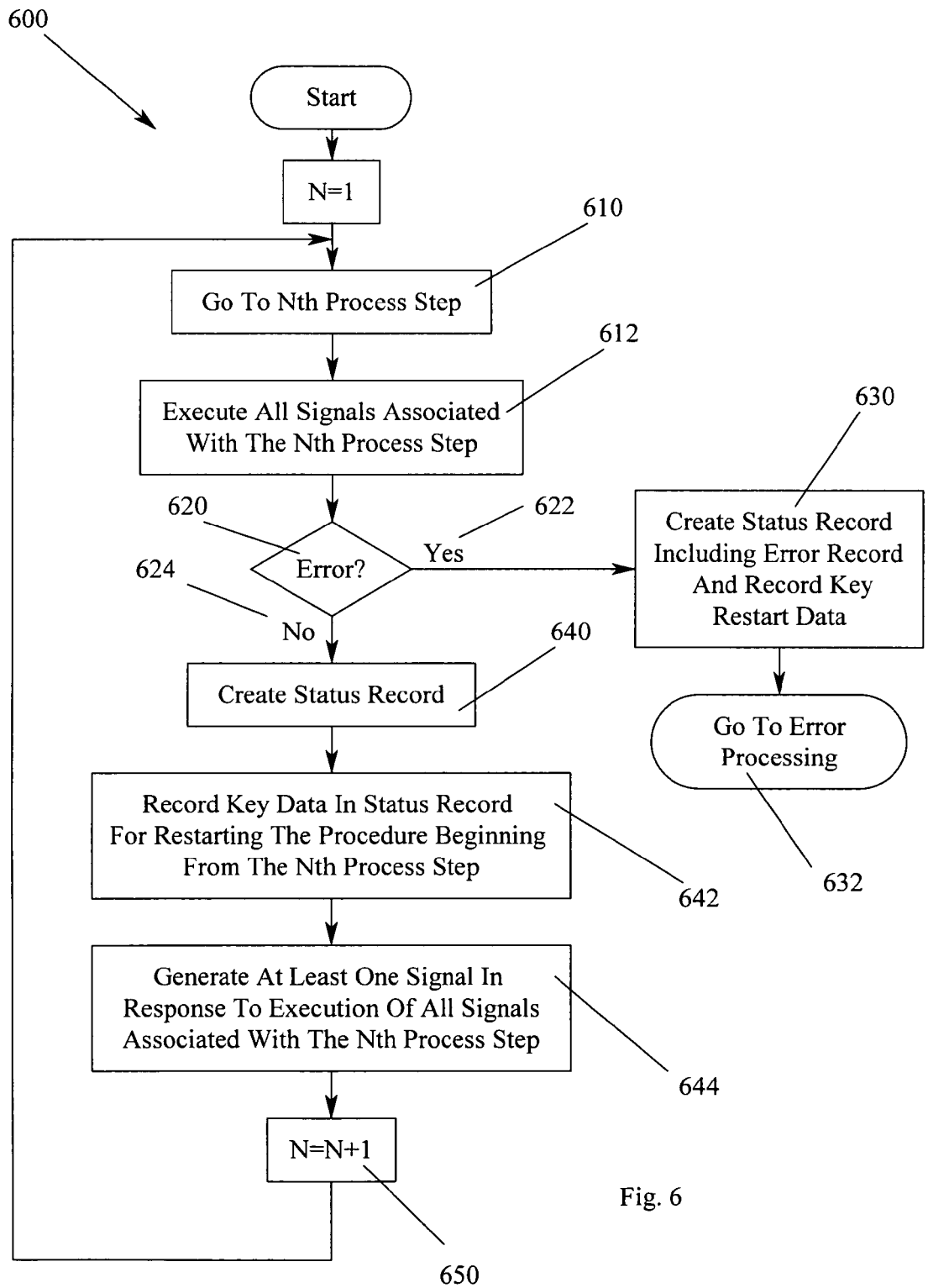
FIG. 6 is a flow chart of the method for managing multiple step processes triggered by a signal according to one embodiment of the present invention.

FIG. 6 is a flow chart 600 of the method for managing multiple step processes triggered by a signal according to one embodiment of the present invention. In FIG. 6, the Nth step of the procedure is processed 610. All signals associated with the Nth process step are executed 612. A determination is made whether an error occurs during processing of the Nth process step 620. If yes 622, a status record that includes an error record and key restart data is created 630. The error is then processed 632. If not 624, a status record is created 640. Key data for restarting the procedure beginning from the Nth process step is recorded in the status record 642. At least one signal is generated in response to execution of the all signals associated with the Nth process step 644. The process then continues to the N+1th step 650.

Figure 7:
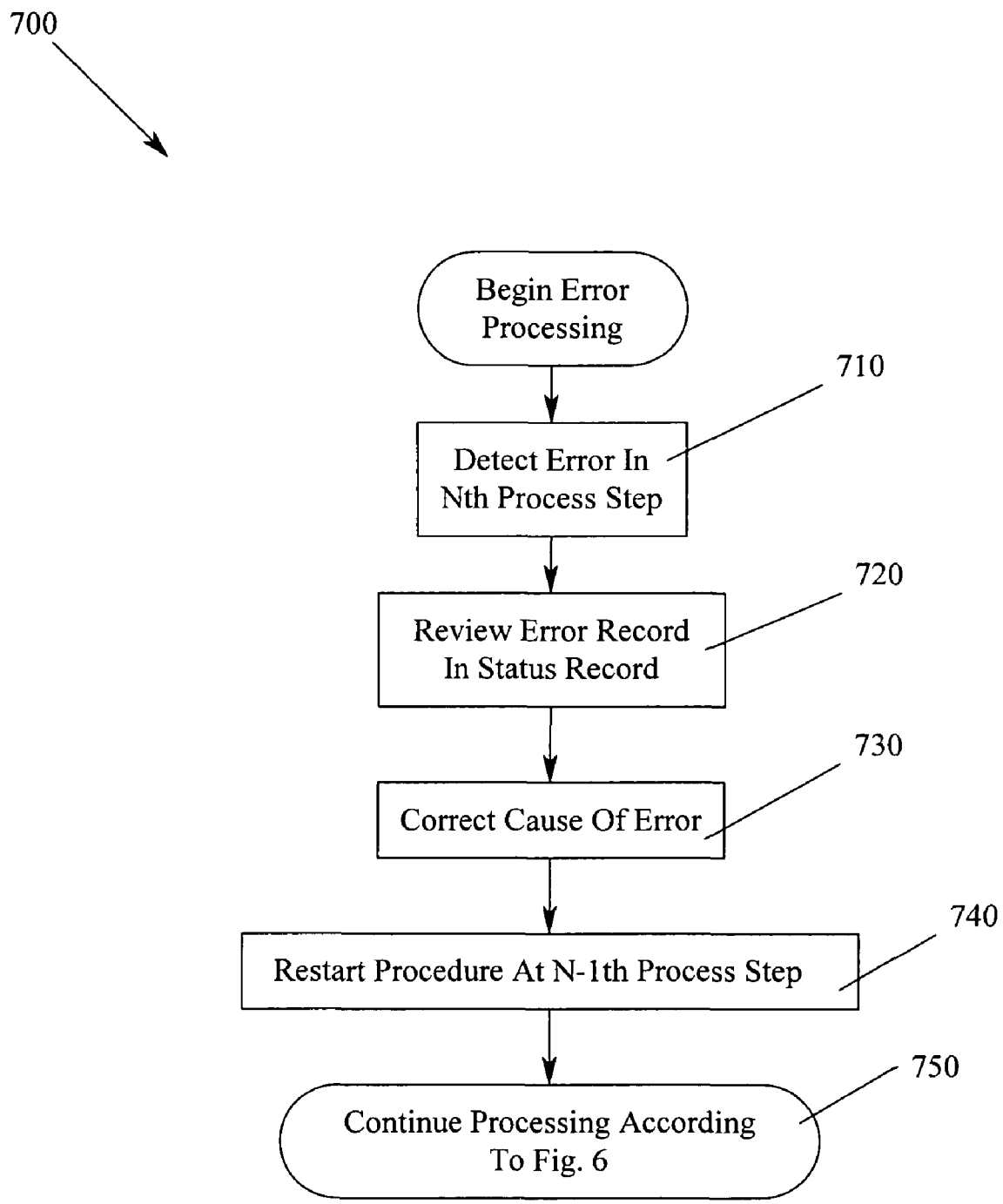
FIG. 7 is a flow chart showing the processing of an error condition according to an embodiment of the present invention.

FIG. 7 is a flow chart 700 showing the processing of an error condition according to an embodiment of the present invention. In FIG. 7, an error is detected in the Nth process step 710. The error record in the status record is reviewed 720. Based upon the error record, the cause of the error is corrected 730. Then, the procedure is restarted at the N−1th process step 740, i.e., the process step immediately before the process step that generated the error event. Thereafter, processing continues to be processed 750 as indicated in FIG. 6.

Referring again to FIG. 3, the process illustrated with reference to FIGS. 1-7 may be tangibly embodied in a computer-readable medium, e.g. one or more of the fixed and/or removable data storage devices 368 illustrated in FIG. 3, or other data storage or data communications devices. A computer program 390 expressing the processes embodied on the removable data storage devices 368 may be loaded into the memory 392 or into the processor 394 to configure the management system 310 of FIG. 3 for execution. The computer program 390 comprise instructions which, when read and executed by the processor 394 of FIG. 3, causes the management system 310 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for managing multiple step processes triggered by a signal, comprising:

establishing a plurality of nodes in a business process chain for supporting production of a product, each of the plurality of nodes representing at least one process involved in production of the product, wherein the business process chain is formed by a sequence of processes that each waits for a trigger signal, and wherein the plurality of nodes are associated with a plurality of parties having responsibility for at least one process associated with one of the plurality of nodes;

receiving at each of the plurality of nodes in the business process chain an incoming trigger signal, wherein at least one of the plurality of nodes in the business process chain receives a plurality of incoming trigger signals;

transmitting by each of the plurality of nodes in the business process chain an outbound trigger signal, wherein at least one of the plurality of nodes in the business process chain transmits a plurality of outbound trigger signals, and wherein the incoming and outbound trigger signals comprises a plurality of different signal types used for different processes at the plurality of nodes;

creating status records by node processors responsible for executing each of the plurality of processes of the plurality of nodes in the business process chain; wherein the status records include key data for restarting the business process chain, and, if associated with a node experiencing an error, an error record;

forwarding the status records to a control processor monitoring the sequence of processes in the business process chain;

presenting, by the control processor, a visual display of the business process chain, the visual display configurable to display each process associated with each of the plurality of nodes in the business process chain and a status record associated with each of the plurality of nodes in the business process chain;

detecting, by the control processor, an error condition occurring in the business process chain;

identifying, by the control processor, a failed node in the business process chain where the error condition occurred;

analyzing, by the control processor, a status record associated with the failed node where the error condition occurred including an error record associated therewith, and analyzing a status record for a node immediately prior to the failed node where the error condition occurred;

determining, by the processor, one of the plurality of nodes for restarting the business process chain based on the analysis of the status record associated with the failed node where the error condition occurred including the error record associated therewith, and the status record for the node immediately prior to the failed node where the error condition occurred; and initiating, by the processor, a restarting of the business process chain at the determined one of the plurality of nodes.

2. The method of claim 1 further comprising monitoring, by the processor, signals between the plurality of parties involved in the business process chain.

3. The method of claim 1, wherein the receiving the incoming and transmitting the outbound trigger signals comprises generating a signal providing information to a party in the business process chain, the information associated with responsibilities of the party in executing tasks for completing at least one process associated with one of the plurality of nodes business process chain.

4. A device for managing multiple stage processes triggered by a signal, comprising:
- memory for storing data for processing;
- a processor, coupled to the memory, the processor configured for providing management of a business process chain by establishing a plurality of nodes in a business process chain for supporting production of a product, each of the plurality of nodes representing at least one process involved in production of the product, wherein the business process chain is formed by a sequence of processes that each waits for a trigger signal, and wherein the plurality of nodes are associated with a plurality of parties having responsibility for at least one process associated with one of the plurality of nodes, wherein each of the plurality of nodes in the business process chain receive an incoming trigger signal, wherein at least one of the plurality of nodes in the business process chain receives a plurality of incoming trigger signals, wherein each of the plurality of nodes in the business process chain transmits an outbound trigger signal, and wherein at least one of the plurality of nodes in the business process chain transmits a plurality of outbound trigger signals, and wherein the incoming and outbound trigger signals comprises a plurality of different signal types used for different processes at the plurality of nodes, the processor receiving status records from each of the plurality of nodes that include key data for restarting the business process chain, and, if associated with a node experiencing an error, an error record;
- wherein the processor presents a visual display of the business process chain, the visual display configurable to display each process associated with each of the plurality of nodes in the business process chain and a status record associated with each of the plurality of nodes in the business process chain, detects an error condition occurring in the business process chain, identifies a failed node in the business process chain where the error condition occurred, analyzes a status record associated with the failed node where the error condition occurred including an error record associated therewith, and a status record for a node immediately prior to the failed node where the error condition occurred, determines one of the plurality of nodes for restarting the business process chain based on the analysis of the status record associated with the failed node where the error condition occurred including the error record associated therewith, and the status record for the node immediately prior to the failed node where the error condition occurred and initiates a restarting of the business process chain at the determined one of the plurality of nodes.

5. The device of claim 4, wherein the processor monitors signals between multiple parties involved in the manufacturing process.

6. The device of claim 4, wherein the incoming and outbound trigger signals provide information to a party in the business process chain, the information associated with responsibilities of the party in executing tasks for completing a stage of the at least one process associated with one of the plurality of nodes business process chain.

7. The device of claim 4, wherein the processor detects the error condition by receiving an email message sent to an email address associated with the device for managing multiple stage processes triggered by a signal.

8. A computer-readable data storage device, comprising:
- program instructions executable by a processing device to perform operations for managing multiple stage processes triggered by a signal, the operations comprising:
    - establishing a plurality of nodes in a business process chain for supporting production of a product, each of the plurality of nodes representing at least one process involved in production of the product, wherein the business process chain is formed by a sequence of processes that each waits for a trigger signal, and wherein the plurality of nodes are associated with a plurality of parties having responsibility for at least one process associated with one of the plurality of nodes;
    - receiving at each of the plurality of nodes in the business process chain an incoming trigger signal, wherein at least one of the plurality of nodes in the business process chain receives a plurality of incoming trigger signals;
    - transmitting by each of the plurality of nodes in the business process chain an outbound trigger signal, wherein at least one of the plurality of nodes in the business process chain transmits a plurality of outbound trigger signals, and wherein the incoming and outbound trigger signals comprises a plurality of different signal types used for different processes at the plurality of nodes;
    - creating status records by node processors responsible for executing each of the plurality of processes of the plurality of nodes in the business process chain; wherein the status records include key data for restarting the business process chain, and, if associated with a node experiencing an error, an error record;
    - forwarding the status records to a control processor monitoring the sequence of processes in the business process chain;
    - presenting, by the control processor, a visual display of the business process chain, the visual display configurable to display each process associated with each of the plurality of nodes in the business process chain and a status record associated with each of the plurality of nodes in the business process chain;
    - detecting, by the control processor, an error condition occurring in the business process chain;
    - identifying, by the control processor, a failed node in the business process chain where the error condition occurred;
    - analyzing, by the control processor, a status record associated with the failed node where the error condition occurred including an error record associated therewith, and analyzing a status record for a node immediately prior to the failed node where the error condition occurred;
    - determining, by the processor, one of the plurality of nodes for restarting the business process chain based on the analysis of the status record associated with the failed node where the error condition occurred including the error record associated therewith, and the status record for the node immediately prior to the failed node where the error condition occurred; and
    - initiating, by the processor, a restarting of the business process chain at the determined one of the plurality of nodes.

9. The computer-readable data storage device of claim 8 further comprising monitoring, by the control processor, signals between multiple parties involved in the business process chain.

10. The program storage device of claim 8, wherein the receiving the incoming and transmitting the outbound trigger signals comprises generating a signal providing information to a party in the business process chain, the information associated with responsibilities of the party in executing tasks for completing at least one process associated with one of the plurality of nodes business process chain.

11. The program storage device of claim 8, wherein the control processor detects the error condition by receiving an email message to an email address associated with the device for managing multiple stage processes triggered by a signal.

12. A device for managing multiple step processes triggered by a signal, comprising:
  means for storing data;
  means, coupled to the means for storing data, for providing management of a business process chain by establishing a plurality of nodes in a business process chain for supporting production of a product, each of the plurality of nodes representing at least one process involved in production of the product, wherein the business process chain is formed by a sequence of processes that each waits for a trigger signal, and wherein the plurality of nodes are associated with a plurality of parties having responsibility for at least one process associated with one of the plurality of nodes, wherein each of the plurality of nodes in the business process chain receives an incoming trigger signal, wherein at least one of the plurality of nodes in the business process chain receives a plurality of incoming trigger signals, wherein each of the plurality of nodes in the business process chain transmits an outbound trigger signal, and wherein at least one of the plurality of nodes in the business process chain transmits a plurality of outbound trigger signals, and wherein the incoming and outbound trigger signals comprises a plurality of different signal types used for different processes at the plurality of nodes;
  the means for providing management further receiving status records from each of the plurality of nodes that include key data for restarting the business process chain, and, if associated with a node experiencing an error, an error record, presents a visual display of the business process chain, the visual display configurable to display each process associated with each of the plurality of nodes in the business process chain and a status record associated with each of the plurality of nodes in the business process chain, detects an error condition occurring in the business process chain, identifies a failed node in the business process chain where the error condition occurred, analyzes a status record associated with the failed node where the error condition occurred including an error record associated therewith, and a status record for a node immediately prior to the failed node where the error condition occurred, determines one of the plurality of nodes for restarting the business process chain based on the analysis of the status record associated with the failed node where the error condition occurred including the error record associated therewith, and the status record for the node immediately prior to the failed node where the error condition occurred and initiates a restarting of the business process chain at the determined one of the plurality of nodes.

* * * * *